United States Patent
Voyatzakis et al.

(10) Patent No.: US 9,775,360 B2
(45) Date of Patent: Oct. 3, 2017

(54) MEAT SHREDDER

(71) Applicant: Somerset Industries, Inc., North Billerica, MA (US)

(72) Inventors: Andrew D Voyatzakis, Carlisle, MA (US); George Athanasiadis, Lexington, MA (US)

(73) Assignee: Somerset Industries, Inc., Lowell, MA (US)

( * ) Notice: Subject to any disclaimer, the term of this patent is extended or adjusted under 35 U.S.C. 154(b) by 227 days.

(21) Appl. No.: 14/858,454

(22) Filed: Sep. 18, 2015

(65) Prior Publication Data

US 2017/0079290 A1 Mar. 23, 2017

(51) Int. Cl.
  *B02C 18/18* (2006.01)
  *A22C 17/00* (2006.01)
  *B02C 18/22* (2006.01)
  *B02C 18/28* (2006.01)
  *B02C 18/14* (2006.01)

(52) U.S. Cl.
  CPC ......... *A22C 17/0026* (2013.01); *B02C 18/18* (2013.01); *B02C 18/2291* (2013.01); *B02C 18/28* (2013.01); *B02C 2018/147* (2013.01); *B02C 2018/188* (2013.01)

(58) Field of Classification Search
  CPC ..... B02C 18/18; B02C 18/2291; B02C 18/28; B02C 2018/188; B02C 2018/147
  USPC ............................ 241/242, 243, 188.2, 152.1
  See application file for complete search history.

(56) References Cited

U.S. PATENT DOCUMENTS

| | | | | |
|---|---|---|---|---|
| 2,716 A | * | 7/1842 | Birely | B02C 4/12 100/155 R |
| 28,960 A | * | 7/1860 | Boulger | B02C 4/12 241/160 |
| 101,984 A | * | 4/1870 | Curtis | B02C 4/10 241/160 |
| 266,599 A | * | 10/1882 | Barbeau | B02B 3/00 241/236 |
| 3,703,970 A | * | 11/1972 | Benson | B02C 18/0084 241/100 |
| 4,011,027 A | * | 3/1977 | Selder | B01F 7/00758 241/188.2 |
| 4,142,688 A | * | 3/1979 | Johnson | B02C 18/0084 241/236 |

(Continued)

*Primary Examiner* — Faye Francis
(74) *Attorney, Agent, or Firm* — Altman & Martin; Steven K Martin (57) ABSTRACT

An apparatus for shredding meat with a hopper and a frame. The hopper has upper and lower rotor assemblies mounted to rotate horizontally within a shredding region. Each rotor assembly is composed of an arbor and fingers arranged in paraxial rows around the arbor. Four rows of pegs extend horizontally into the shredding region. A front row and a back row are each 0.75 inch above and below, respectively, the upper rotor assembly. A back row and a front row are each 0.75 inch above and below, respectively the lower rotor assembly. The hopper is suspended in the frame, which houses the drive mechanism that rotates the rotor assemblies in opposite directions. The upper rotor assembly pushes product dropped into the shredding region into the upper back row to shred the product. The lower rotor assembly pushes the shredded product into the lower front row to further shred the product.

9 Claims, 14 Drawing Sheets

(56) References Cited

U.S. PATENT DOCUMENTS

| | | | | |
|---|---|---|---|---|
| 4,399,948 | A * | 8/1983 | Treffner | B02C 13/22 |
| | | | | 241/154 |
| 4,449,672 | A * | 5/1984 | Morlock | A01D 87/127 |
| | | | | 241/101.76 |
| 4,572,443 | A | 2/1986 | Coleman | |
| 4,691,867 | A * | 9/1987 | Iwako | B01F 7/00766 |
| | | | | 241/101.8 |
| 4,927,088 | A * | 5/1990 | Brewer | B02C 18/225 |
| | | | | 241/223 |
| 5,277,371 | A * | 1/1994 | Bowns | D21B 1/066 |
| | | | | 241/154 |
| 5,333,802 | A * | 8/1994 | Seelig | A23G 9/04 |
| | | | | 241/243 |
| 5,462,238 | A * | 10/1995 | Smith | B02C 18/145 |
| | | | | 241/243 |
| 5,639,035 | A * | 6/1997 | Maugle | B02C 18/141 |
| | | | | 241/236 |
| 5,833,152 | A * | 11/1998 | Galanty | B02C 18/0092 |
| | | | | 241/141 |
| 6,966,513 | B2 * | 11/2005 | Chang | B02C 18/0007 |
| | | | | 241/101.01 |
| 7,607,600 | B2 * | 10/2009 | Salgado | A22C 17/0026 |
| | | | | 241/199.12 |
| 8,727,248 | B2 * | 5/2014 | Galanty | B02C 18/0092 |
| | | | | 241/243 |
| 2006/0043223 | A1* | 3/2006 | Filgueiras | B03B 5/00 |
| | | | | 241/152.1 |
| 2008/0041983 | A1 | 2/2008 | Bridge | |
| 2009/0072058 | A1 | 3/2009 | Salgado et al. | |
| 2011/0114773 | A1* | 5/2011 | Carpenter | B02C 18/14 |
| | | | | 241/243 |
| 2013/0118325 | A1 | 5/2013 | Thomas et al. | |

\* cited by examiner

MEAT SHREDDER

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention relates to food processing equipment, more particularly, to an apparatus for shredding meat.

2. Description of the Related Art

Restaurants and the like often have items on their menus that require shredded meat, for example, pulled pork or chicken. There are a number of machines on the market for shredding meat. The shredder needs to be capable of shredding large quantities of meat quickly and efficiently in order to reduce food preparation time, while being easy to operate and clean.

The main problem with these machines is that they leave chunks of meat un-shredded and the user has to pass it again a few times or finish by hand to simulate shredded or pull out meat.

BRIEF SUMMARY OF THE INVENTION

The present invention, an apparatus for shredding meat, has a hopper and a frame. The hopper is the enclosure wherein the meat is shredded. It has as clamshell structure with a front wall, back wall, right side wall, left side wall, a top opening, and a bottom opening, all defining a shredding region. The back shell rotates downwardly to provide access to the shredding region for cleaning.

An upper rotor assembly and lower rotor assembly are mounted to rotate horizontally within the shredding region. Each rotor assembly is composed of an arbor and a plurality of fingers. The fingers extend from the arbor in four paraxial rows spaced equally around the circumference of the arbor.

The frame has a right stand and a left stand attached together by crossbars. The hopper is suspended between the stands by arms. The drive mechanism resides in one stand and rotates the rotor assemblies in opposite directions. The drive mechanism can be manually operated or can be operated by motors.

The meat is shredded by a combination of stationary stainless steel pegs and the moving stainless steel fingers within the shredding region. Two rows of pegs extend horizontally into the shredding region from the front wall and two rows of pegs extend horizontally into the shredding region from the back wall. The upper front row of pegs is 0.75 inch above the upper rotor assembly. The upper back row of pegs is 0.75 inch below the upper rotor assembly. The lower back row of pegs is 0.75 inch above the lower rotor assembly. The lower front row of pegs is 0.75 inch below the lower rotor assembly. This vertical spacing provide greater force for shredding the product.

The product to be shredded is dropped into the shredding region where the clockwise-rotating upper rotor assembly pushes the product into the upper back row of pegs. This action mostly shreds the product, which drops to the lower rotor assembly. Any product that sticks to the upper rotor assembly is knocked off by the upper front row of pegs.

The product dropping onto the lower rotor assembly is pushed into the lower front row of pegs and is further shredded before dropping out the bottom opening. Any product sticking to the lower rotor assembly is knocked off by the lower back row of pegs.

Objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein.

DETAILED DESCRIPTION OF THE INVENTION

The present invention, shown in the figures, is an apparatus 10 for shredding meat. The shredder 10 has two main components, a hopper 12 and a frame 14, as shown in FIGS. 1-4.

The hopper 12 is the enclosure wherein the meat is shredded and is shown in detail in FIGS. 5-8. The hopper 12 has a front wall 26, a back wall 28, a right side wall 30, a left side wall 32, a top opening 34, and a bottom opening 36, all defining a shredding region 20. The terms front, back, right, and left are used relative to the full assembly of FIG. 1. Optionally, short beveled sections 38, 40 extend from the top of the front wall 26 and back wall 28 as guides to the top opening 34.

Figure 5:
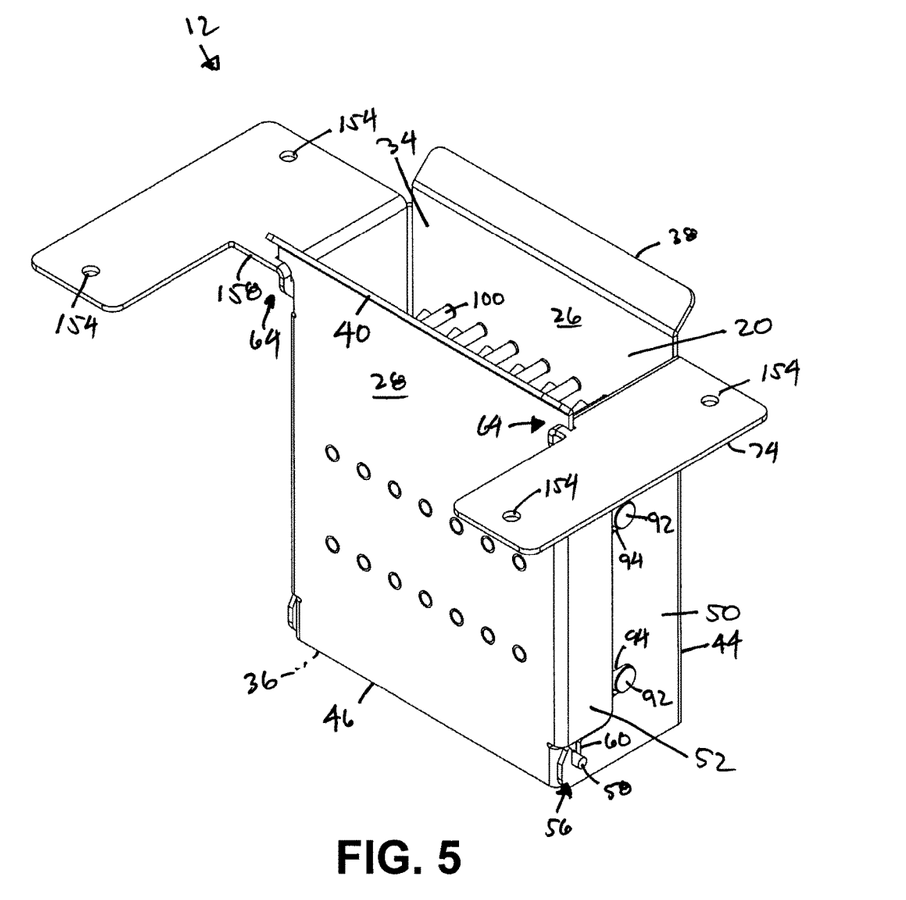
FIG. 5 is a rear perspective view of the hopper of FIG. 1 in the closed position.
Figure 6:
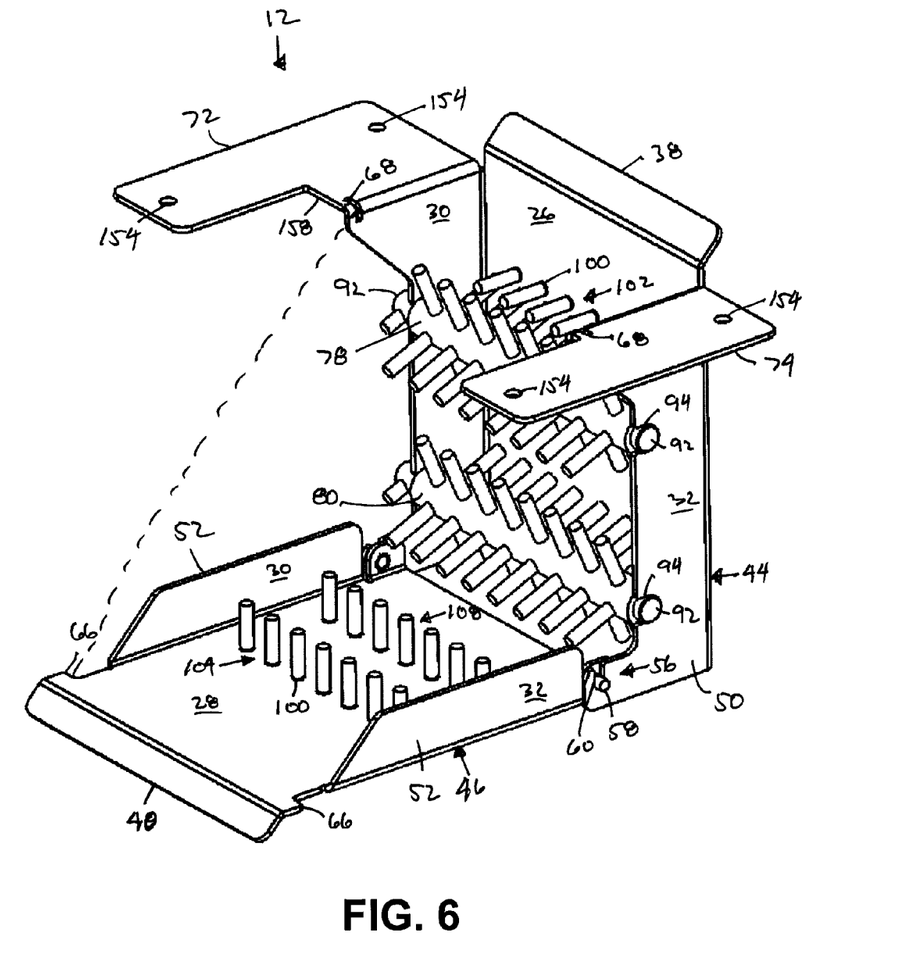
FIG. 6 is a view of the hopper of FIG. 5 in the open position.
Figure 7:
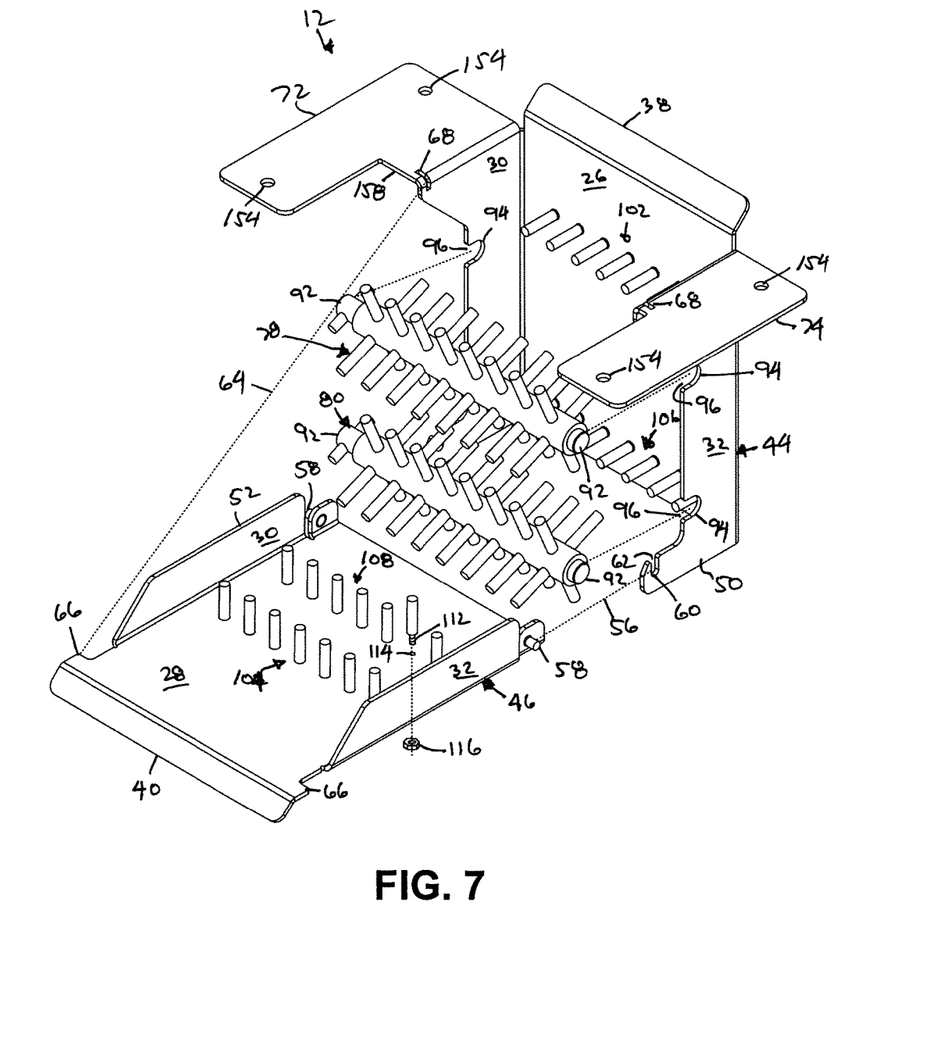
FIG. 7 is an exploded view of the hopper of FIG. 5.

The hopper 12 has a clamshell structure, with a front shell 44 and a back shell 46. The front shell 44 incorporates the front wall 26 and a front section 50 of the side walls 30, 32. The back shell 46 incorporates the back wall 28 and a back section 52 of the side walls 30, 32.

The back shell 46 rotates downwardly to an open position at a pivot point 56. The pivot point 56 comprises short spindles 58 extending from the back section 52 of the side walls 30, 32 that sit in semicircular notches 60 in the front section 50 of the side walls 30, 32. The notches 60 are open at the top, as at 62, so that the back shell 46 can be lifted and removed completely from the front shell 44.

When the back shell 46 is pivoted up to the closed position, it is retained in this position by a shell closure 64. The present invention contemplates that the shell closure 64 can be any mechanism that will retain the hopper 12 in the closed position during use. In the present design, the shell closure 64 comprises horizontal tabs 66 at the top of the back wall 28 that drop into slots 68 in the top of the front section 50 of the side walls 30, 32. To open the hopper 12, the back shell 46 is lifted slightly from the front shell 44 until the tabs 66 clear the slots 68 and the back shell 46 is pivoted downwardly. To close the hopper 12, the back shell 46 is pivoted upwardly while being lifted slightly from the front shell 44 until the tabs 66 are aligned with the slots 68 and then the back shell 46 is dropped until the tabs 66 are in the slots 68.

An example of another closures 64 includes mating detents in overlapping portions of the side wall sections.

Arms 72, 74 extend horizontally from the front section 50 of the side walls 30, 32. The arms 72, 74 are used for mounting the hopper 12 to the frame 14, as described below.

The front shell 44 and back shell 46 are preferably composed of stainless steel but can be composed of any other material that meets requirements for handling food products. For the front shell 44, a sheet of the appropriate shape is folded 90° to form the side wall sections front and the top of the side wall front sections 50 are folded 90° to form the arms 72, 74. The top of the front wall 26 is folded approximately 45° away from the side wall front sections 50 to form the front beveled section 38. For the back shell 46, a sheet of the appropriate shape is folded 90° to form the side wall back sections 52 and the top of the back wall 28 is folded approximately 45° away from the side wall back sections 52 to form the back beveled section 40.

Figure 8:
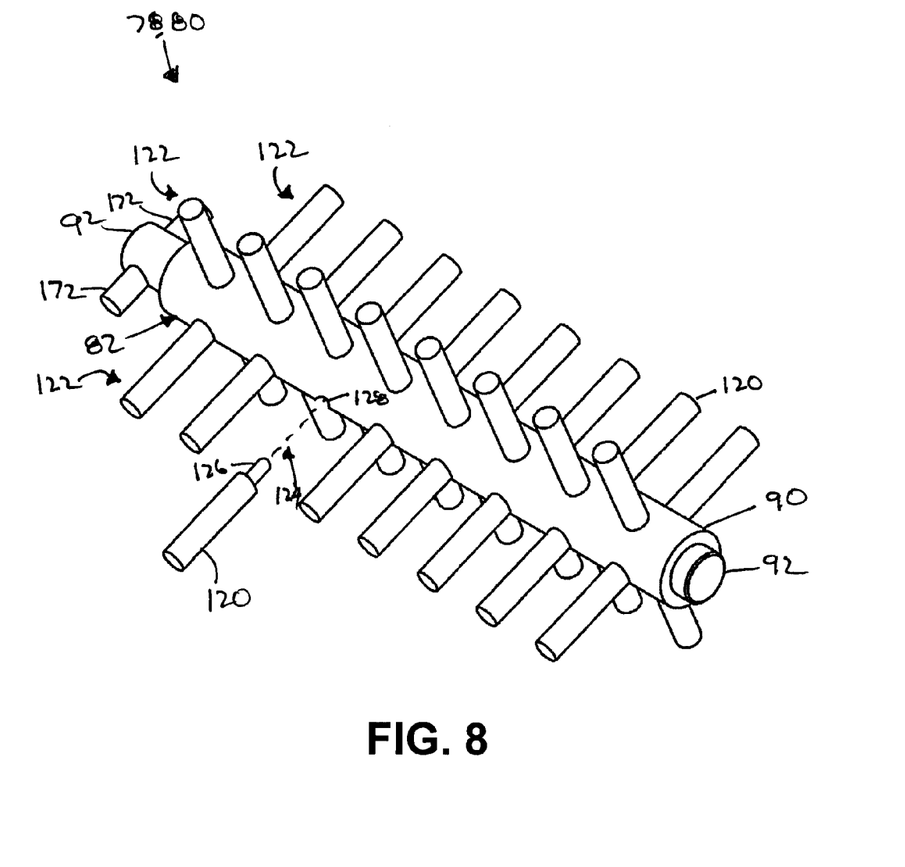
FIG. 8 is a view of a rotor assembly of FIG. 7.

An upper rotor assembly 78 and a lower rotor assembly 80 are mounted between the right side 30 and left side 32 to rotate horizontally within the shredding region 20. Each rotor assembly 78, 80, shown in FIG. 8, is composed of an arbor 82 and a plurality of fingers 120. The arbor 82 has a central section 90 with a length that is essentially the same as the hopper long dimension 22. Extending axially from each end of the central section 90 are short spindles 92. The spindles 92 are mounted to rotate within semicircular notches 94 in the side wall front sections 50. The notches 94 have openings 96 so that the rotor assemblies 78, 80 can be removed from and reinstalled in the front shell 44. The diameter of the central section 90 is larger than that of the notches 94 so that the rotor assemblies 78, 80 do not displace horizontally. The rotor assemblies 78, 80 are retained in the notches 94 by the side wall back sections 52 when the back shell 46 is closed. It is expected that fat from the meat being shredded will lubricate the spindles 92. Optionally, the notches 94 include bushings to minimize wear. Optionally, the bushings are self-lubricating.

Figure 4:
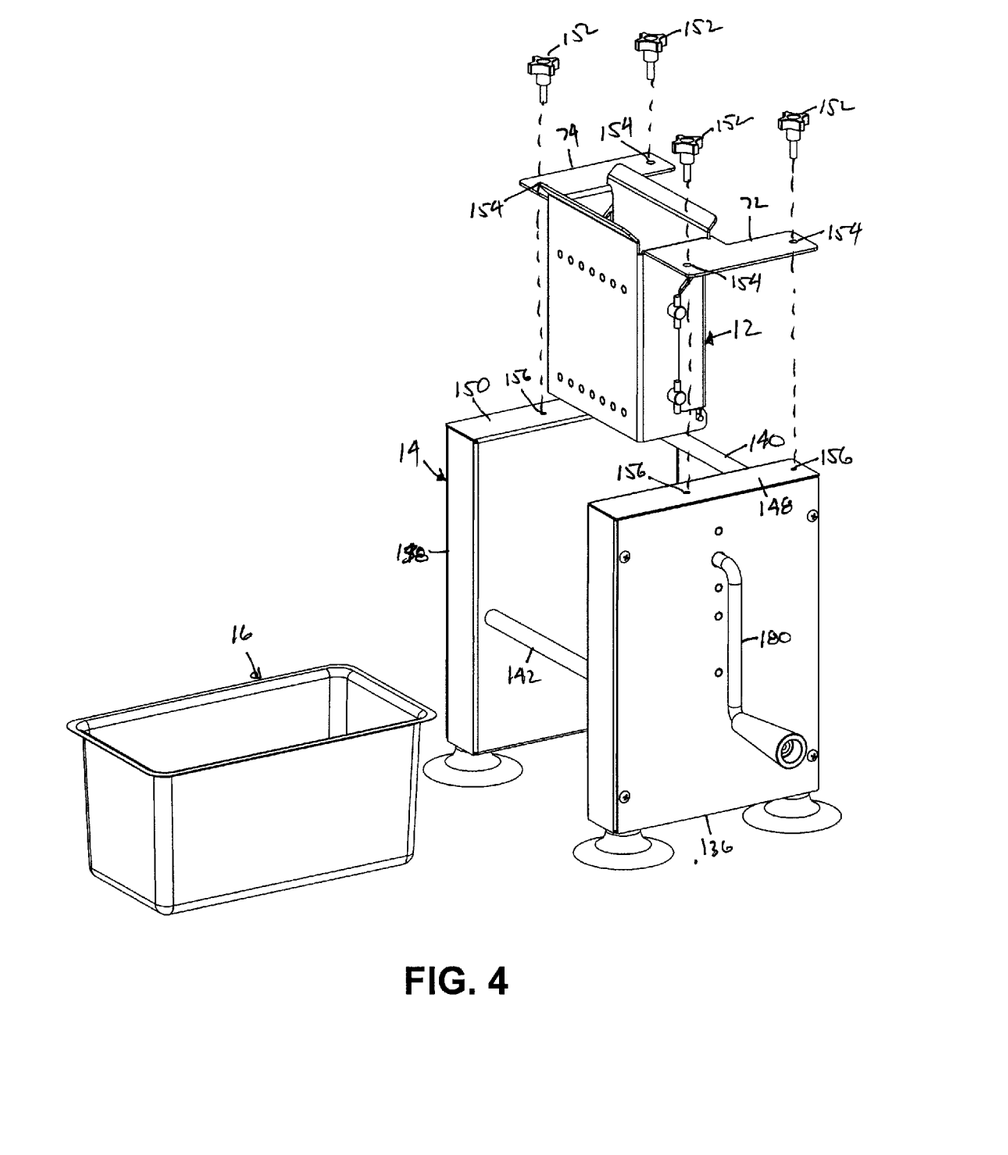
FIG. 4 is a partially exploded vice of the apparatus of FIG. 1.

The frame 14 has a right stand 136 and a left stand 138 attached together by crossbars. In the present design, there is an upper back crossbar 140 and a lower front crossbar 142. The hopper 12 fits in the space 144 between the stands 136, 138 such that the arbors 82 are parallel with the crossbars 140, 142. The arms 72, 74 rest on the upper surfaces 148, 150 of the stands 136, 138 so that the hopper 12 is suspended in the hopper space 144. The arms 72, 74 are retained by thumb screws 152 through holes 154 in the arms 72, 74 and turned into threaded holes 156 in the upper surfaces 148, 150.

Optionally, the frame 14 has four feet 146. Optionally, the feet 146 have suction cups to stick to a table so that the shredder 10 does not move during operation.

Figure 3:
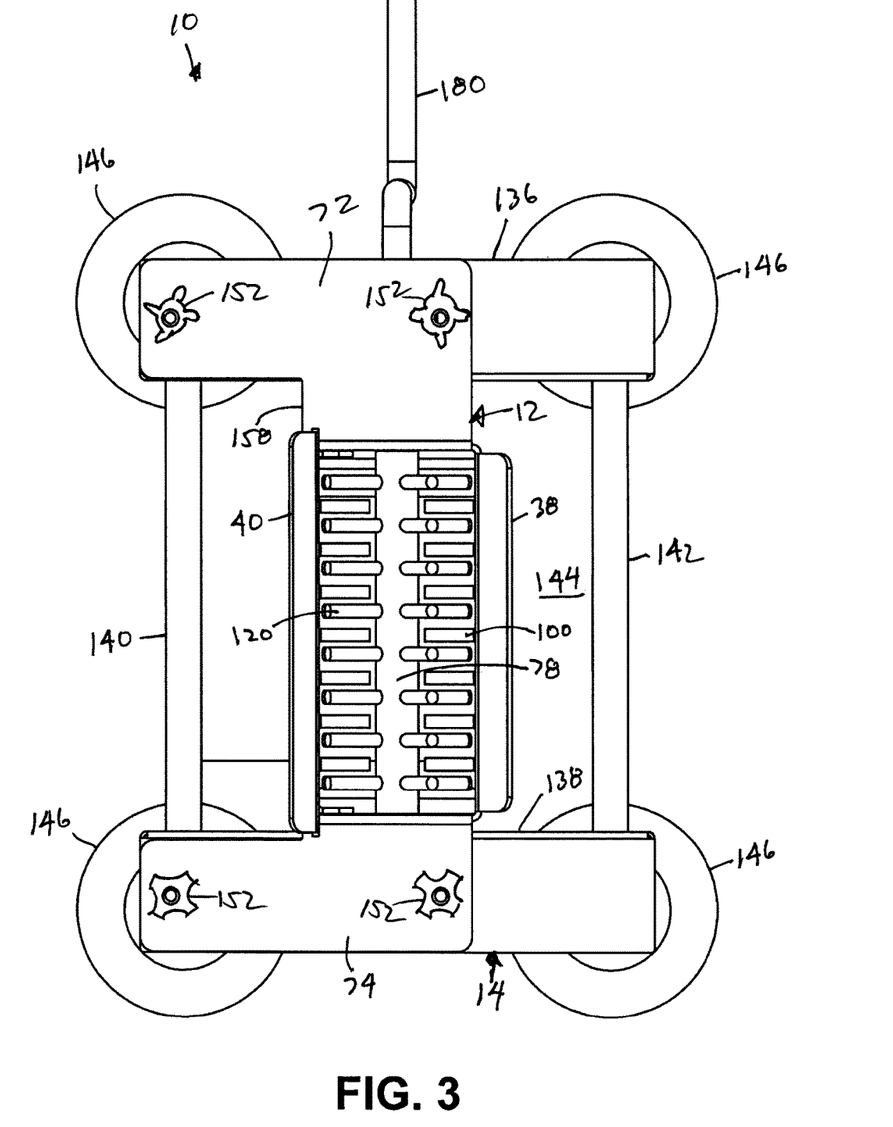
FIG. 3 is a front elevational view of the apparatus of FIG. 1.

The hopper 12 is offset toward one stand 138, the left stand in FIG. 3, so that there is a gap 158 between the hopper 12 and the right stand 136. Extending into the gap 158 are the arbor spindles 92 to mesh with the drive mechanism 160.

Figure 9:
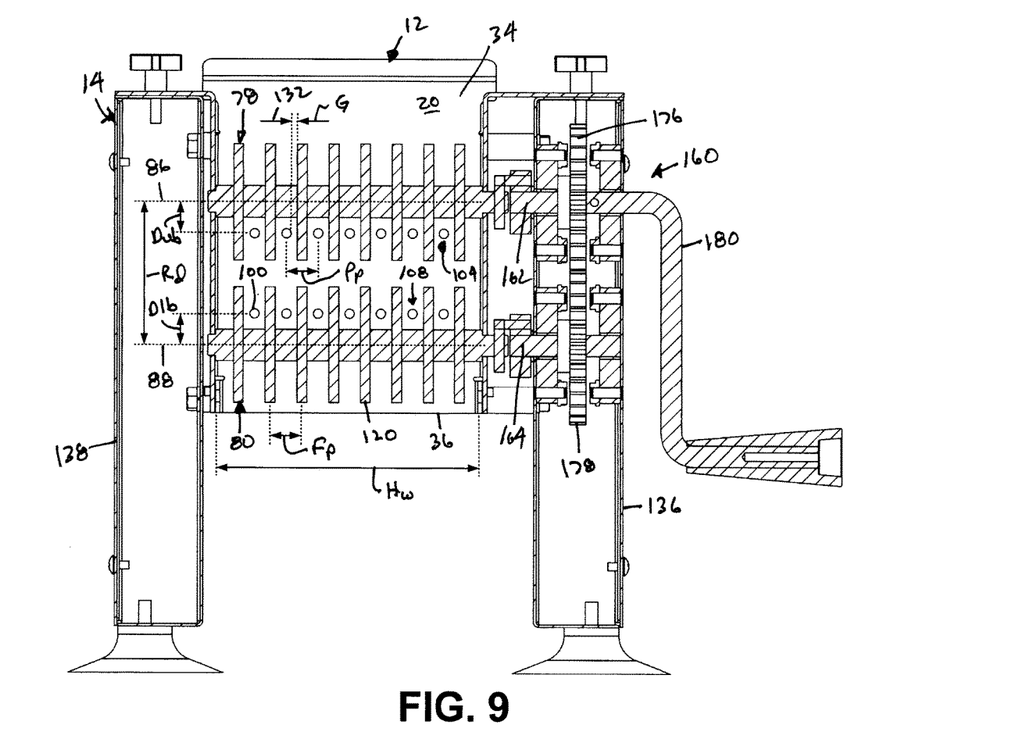
FIG. 9 is a front cross-sectional view of the hopper identifying parameters.
Figure 10:
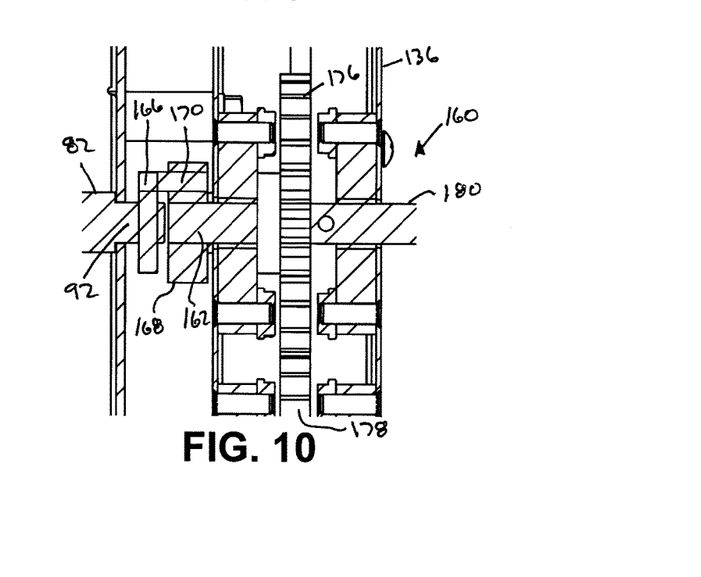
FIG. 10 is a cross-sectional detail view of the upper rotor assembly drive mechanism.

The drive mechanism 160, shown in FIGS. 9 and 10, resides within the right stand 136, the stand that the hopper 12 is spaced from. The drive mechanism 160 includes an upper drive shaft 162 to drive the upper rotor assembly 78 and a lower drive shaft 164 to drive the lower rotor assembly 80. As shown in FIG. 10, at the end of the drive shafts 162, 164 is a disk 168 with a paraxial tine 170 that overlaps the arbor spindle 92. The tine 170 captures one of two pins 172 extending radially from the spindle 92 when the drive shaft 162, 164 rotates, thereby rotating the rotor assembly 78, 80.

In the present design, the upper drive shaft 162 is driven by an upper gear 176 and the lower drive shaft 164 is driven by a lower gear 178. The gears 176, 178 mesh and are the same size so that the rotor assemblies 78, 80 rotate at the same speed in opposite directions. In the present design, a handle 180 is used to manually turn the upper gear 176.

The present invention contemplates that one or two motors can be used to turn the drive shafts 162, 164. A single motor can be attached to one of the meshed gears 176, 178. Alternatively, each drive shaft 162, 164 can have a separate motor, which would permit independent rotational control of the rotor assemblies 78, 80. If necessary, each motor includes gearing to lower the motor to the rotational speed desired for the shredder 10.

The meat is shredded by a combination of stationary pegs 100 and moving fingers 120 within the shredding region 20. There are two rows 102, 104 of pegs 100 extending horizontally into the shredding region 20 from the front wall 26 and two rows 106, 108 of pegs 100 extending horizontally into the shredding region 20 from the back wall 28.

Each peg 100 is preferably a stainless steel cylindrical dowel but can be composed of any material that is strong enough and that meets requirements for handling food products. The peg 100 is mounted to the wall 26, 28 in any manner that is robust enough to withstand the stresses during operation of the shredder 10. In one example, shown in FIG. 7, the peg 100 has a threaded extension 112 that fits through a hole 114 in the wall 26, 28 and is retained by tightening a nut 116 on the threaded extension 112. In another example, the extension 112 is press-fit into the hole 114. In another example, the hole 114 is threaded and the threaded extension 112 is turned into the hole 114. In another example, the peg 100 is permanently attached to the wall 26, 28 by welding, adhesive, or other suitable method.

The fingers 120 extend from the arbor 82 in paraxial rows 122. In the present design, there are four rows 122, but any number can be used. Preferably, the rows 122 are spaced equally around the circumference of the arbor 82.

As shown in FIG. 8, each finger 120 is preferably a stainless steel cylindrical dowel but can be composed of any material that is strong enough and that meets requirements for handling food products. The finger 120 is attached to the arbor 82 in any manner that is robust enough to withstand the stresses during operation of the shredder 10. In the present design, the attachment 124 includes the finger 120 having an extension 126 that is press-fit into a hole 128 in the arbor 82. Alternatively, the finger 120 is retained in the hole 128 by an adhesive. Alternatively, the extension 126 and hole 128 are threaded and the extension 126 is turned into the hole 128.

Figure 11:
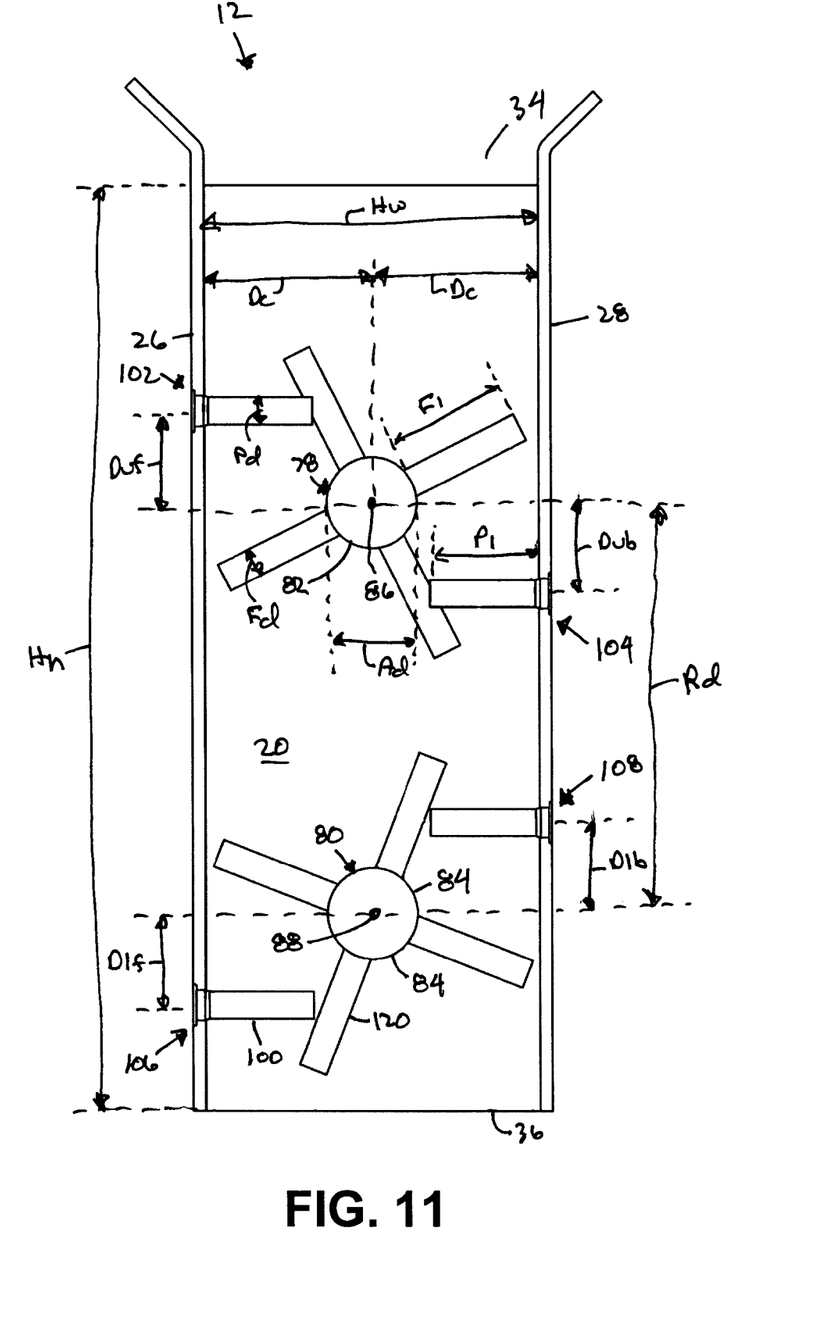
FIG. 11 is a side cross-sectional side view of the hopper identifying parameters.
Figure 12:
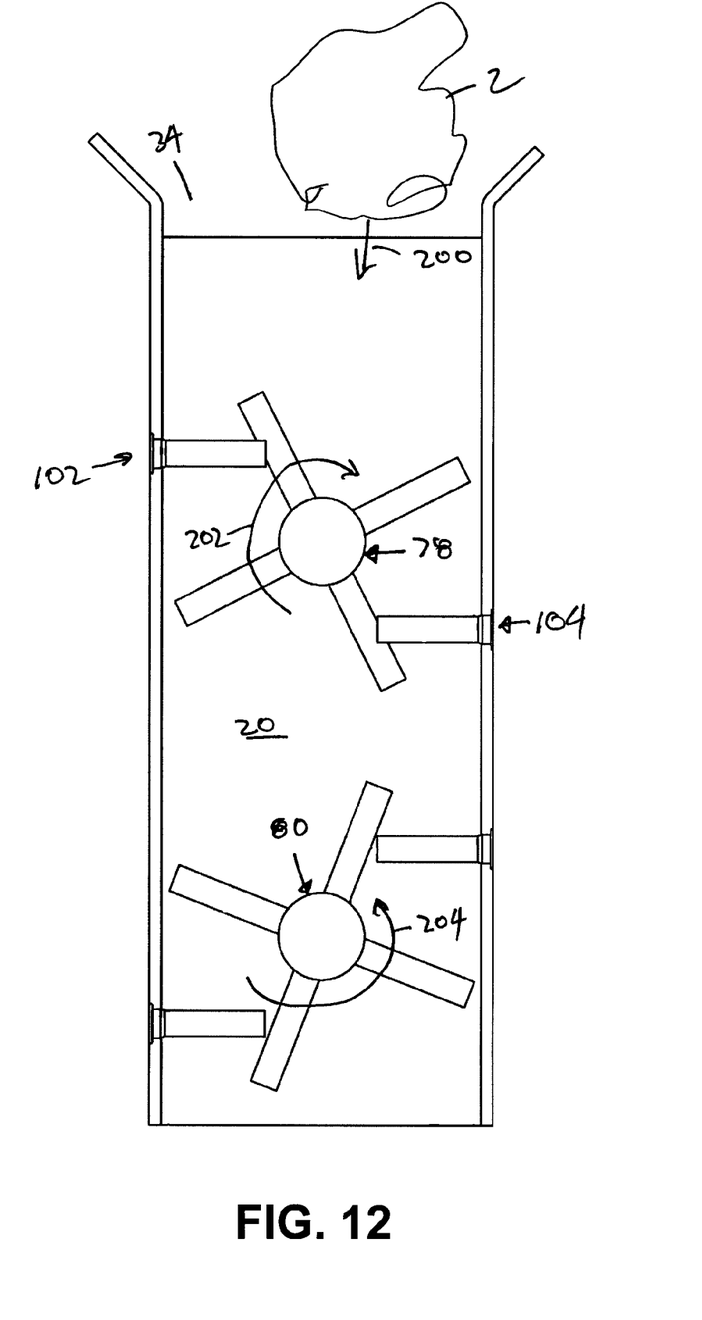
FIGS. 12-15 are side cross-sectional views of the hopper showing the operation of the shredder of FIG. 1.
Figure 13:
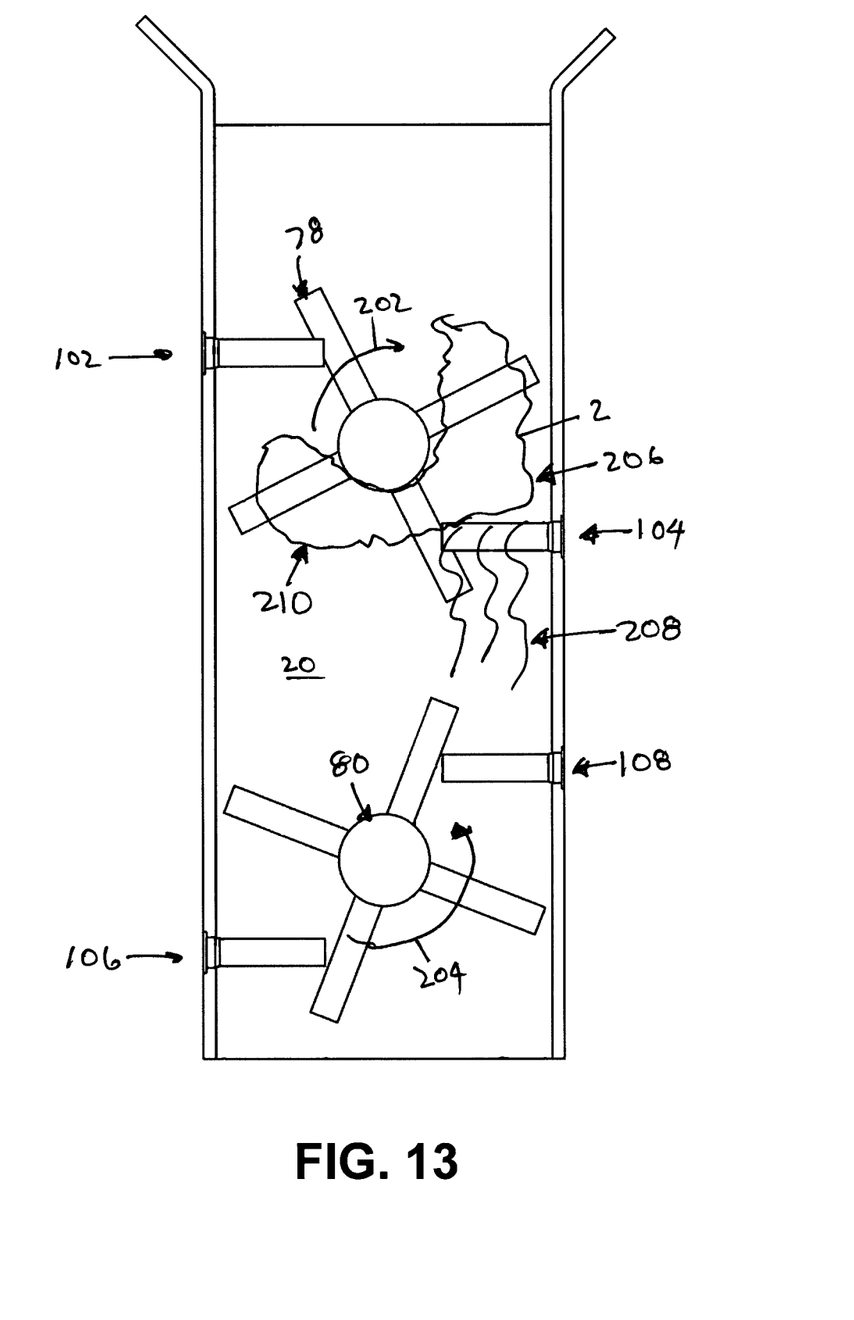
Figure 14:
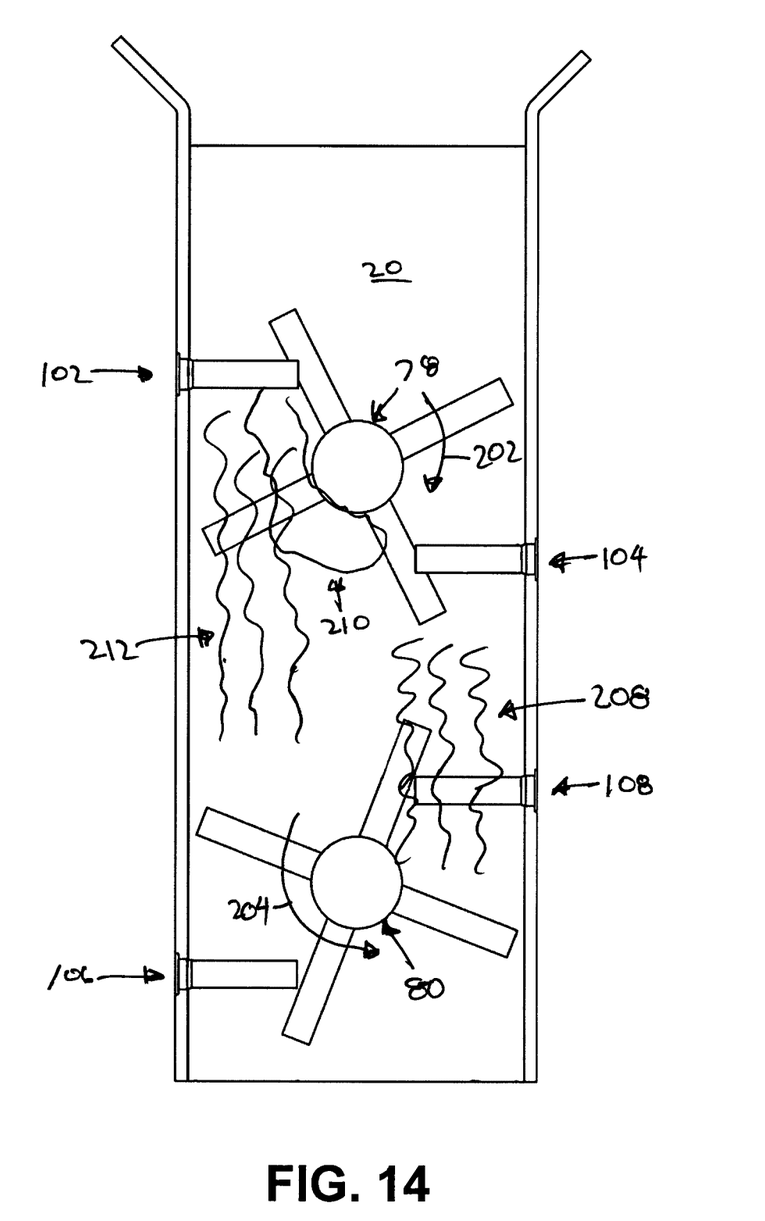

The locations and parameters of the various components in the hopper 12 are shown in FIGS. 9 and 11. As can be seen in FIG. 11, the rotor assemblies 78, 80 are vertically aligned.

The diameter of the rotor assemblies 78, 80 is slightly smaller than the depth of the shredding region 20 so that the product being shredded cannot bypass the rotor assemblies 78, 80 and miss being shredded.

As can be seen in the FIG. 9, the fingers 120 are positioned between the pegs 100 so that they interleave as the rotor assemblies 78, 80 rotate. In the present design, there are seven pegs 100 in each peg row 102, 104, 106, 108 and eight fingers 120 in each finger row 122. The number of pegs 100 and fingers 120 in each row is determined by the product that the shredder 10 is designed for. The parameters are as follows:

Hw is the width of the front wall 26 and back wall 28 of the hopper 12, which is the width of the shredding region 20. In the present design, Hw=6.35 inches. This distance can vary and will determine, in part, how many pegs 100 and fingers 120 there will be in each row. Also, Hw can be changed to accommodate multiples of peg pitch and finger pitch, the spacing between pegs and fingers, respectively.

Hd is the width of the side walls 30, 32 of the hopper 12, which is the depth of the shredding region 20. In the present design, Hd=2.76 inches. This distance can vary and will be determined, in part, by the peg length Pl, the finger length Fl, and the arbor diameter Ad.

Hh is the height of the walls 26, 28, 30, 32, which is the height of the shredding region 20. In the present design, Hh=7.45 inches. This distance can vary significantly because the hopper height is not critical to the operation of the shredder 10.

Rd is the vertical distance between the rotor assemblies 78, 80. In the present design, Rd=3.38 inches. This distance can vary since there is no critical correlation between this distance and how well the shredder 10 operates. It can also depend on the height of the hopper Hh or the height of the hopper Hh can depend on the Rd. The rotor assemblies 78, 80 must be spaced far enough apart so that the fingers of each rotor assembly do not collide with each other during operation. Consequently, Rd must be greater than the sum of the arbor diameter Ad and two finger lengths Fl, or Rd>Ad+2*Fl.

Dc is the horizontal distance between the rotor assemblies 78, 80 and both the front wall 26 and the back wall 28. In the present design, Dc=1.38 inches. The minimum value for this parameter is related to the peg length Pl, the finger length Fl, and the arbor diameter Ad. With the current parameter values, see below, the fingers have a 0.005 inch clearance from the front and back walls.

Duf is the vertical distance between the upper rotor assembly 78 and the upper front peg row 102. Dub is the vertical distance between the upper rotor assembly 78 and the upper back peg row 104. Dlf is the vertical distance between the lower rotor assembly 80 and the lower front peg row 106. Dlb is the vertical distance between the lower rotor assembly 80 and the lower back peg row 108. In the present design, Duf=Dub=Dlf=Dlb=0.75 inch. This distance was determined by experimentation to be the optimal general-purpose distance for providing the most efficient force on the product for shredding. Depending on the product the shredder 10 is designed to process, Duf, Dub, Dlf, and Dlb can range from 0.25 inch to 2 inches.

Pp is the peg pitch, that is, the horizontal distance between peg centers. Fp is the finger pitch, that is, the horizontal distance between finger centers. In the present design, Pp=Fp=0.75 inch. The peg and finger pitches can vary depending on the product the shredder 10 is designed to process. Also, by decreasing the pitch, the product can be shredded more finely.

Ad is the diameter of the arbor. Pl and Pd are the length and diameter of each peg 100, respectively. Fl and Fd are the length and diameter of each finger 120, respectively. In the present design, Ad=0.75 inch, Pl=0.9 inch, Pd=0.223 inch, Fl=1.0 inch, and Fd=0.15 inch. These parameters, particularly the length of the pegs and fingers, can be changed depending on the product that the shredder 10 is designed to process. The peg and finger lengths can vary from 0.25 inch to 2 inches.

G is the width of the gap 132 between adjacent finger and peg as they pass each other. The gap 132 is space that the product is forced through for shredding. G is a function of the peg diameter Pd, the finger diameter Fd, and peg pitch Pp, and the finger pitch Fp. If the peg pitch and the finger pitch are the same (Pp=Fp), as in the present design, all the gaps 132 have the same width and is G=Pp−Pd/2−Fd/2. In the present design, G=0.75−(0.223/2)−(0.15/2)=0.1885 inch. If Pp and Fp were not the same, the gaps would have two different alternating widths.

The values of the parameters described above were determined by experimentation to be the optimal parameters for a general-purpose shredder. The parameters can be modified in order to optimize the shredder for specific products.

The operation of the shredder 10 of the present invention is shown in FIGS. 12-15. The product 2 to be shredded is put into the top opening 34 to drop into the shredding region 20, as at 200 in FIG. 12. The upper rotor assembly 78 is rotating clockwise, as at 202, and the lower rotor assembly 80 is rotating counterclockwise, as at 204. As the upper rotor assembly 78 moves the product clockwise, the product is blocked by the pegs 100 of the upper back row 104, as at 206, and is mostly shredded by this action. Some of the product drops down to the lower rotor assembly 80, as at 208, and some of the product wraps around and sticks to the upper rotor assembly 78, as at 210, as in FIG. 13. This product is blocked and knocked off by the pegs 100 of the upper front row 102, causing it to drop to the lower rotor assembly 80, as at 212 in FIG. 14. Although most preferable, the present invention does contemplate that the upper front row 102 is optional and that the upper back row 104 can also knock off the stuck product at the next rotation of the upper rotor assembly 78.

Figure 15:
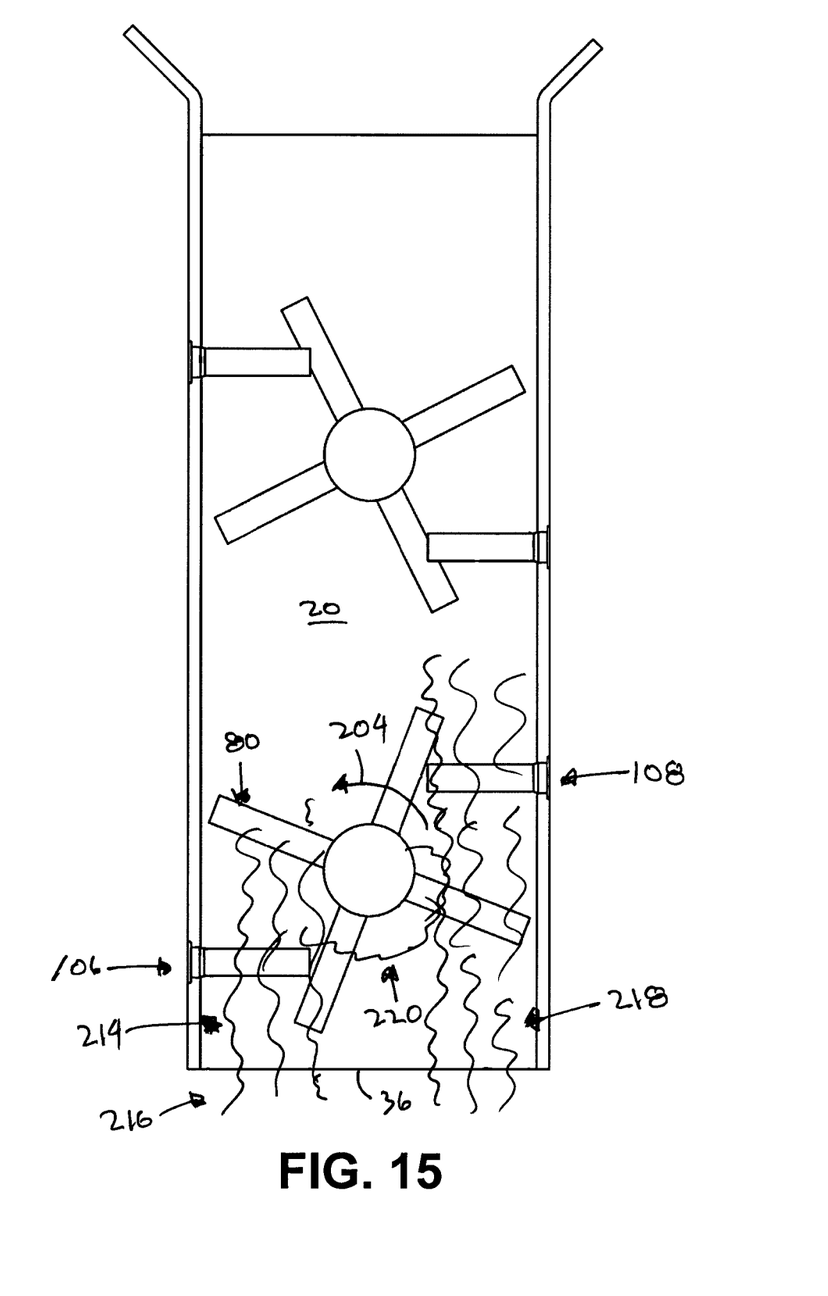

The product dropping onto the lower rotor assembly 80 is pushed into the pegs 100 of the lower front row 106, as at 214, and is further shredded before dropping out the bottom opening 36, as at 216 in FIG. 15. Any product sticking to the lower rotor assembly 80, as at 220, is knocked off by the pegs 100 of the lower back row 108, as at 218. Although most preferable, the present invention does contemplate that the lower back row 108 is optional and that the upper front row 106 can knock off the stuck product at the next rotation of the lower rotor assembly 80.

Figure 1:
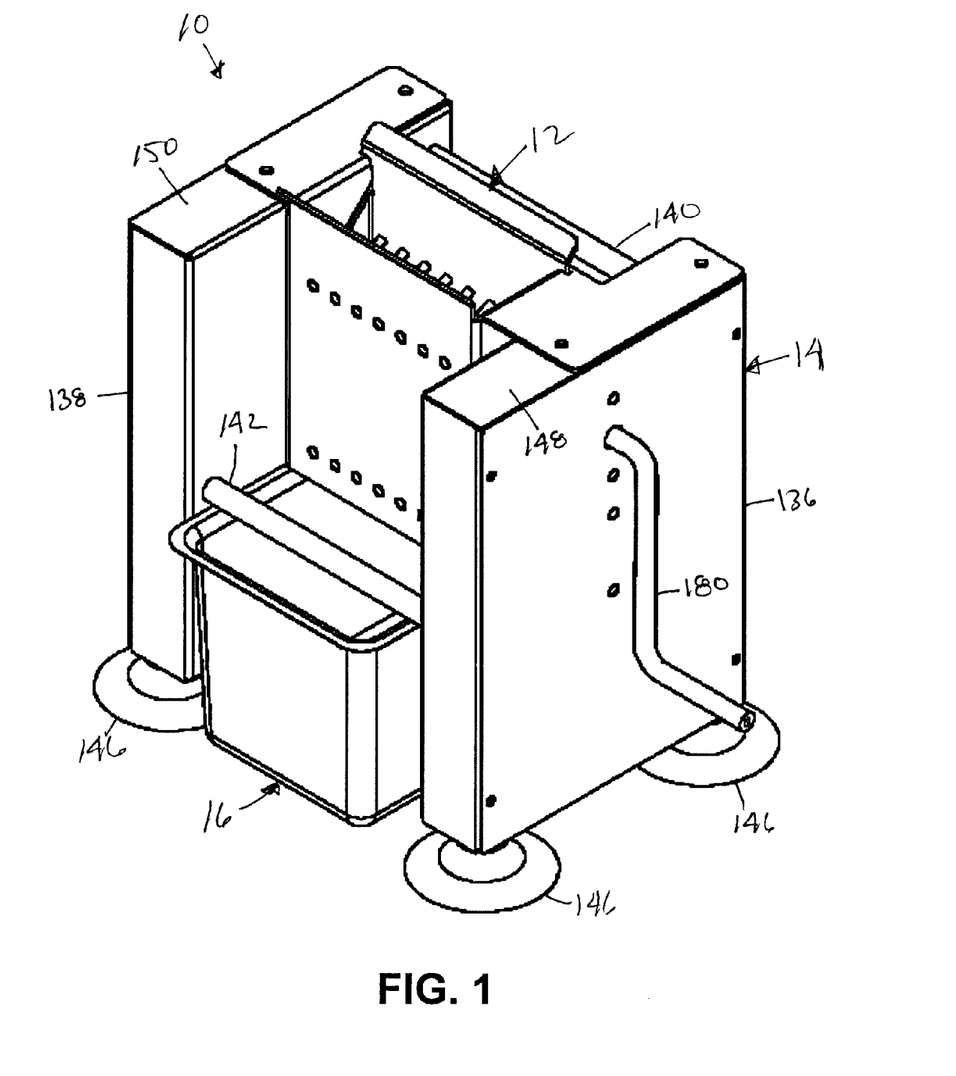
FIG. 1 is a front perspective view of the apparatus of the present invention.
Figure 2:
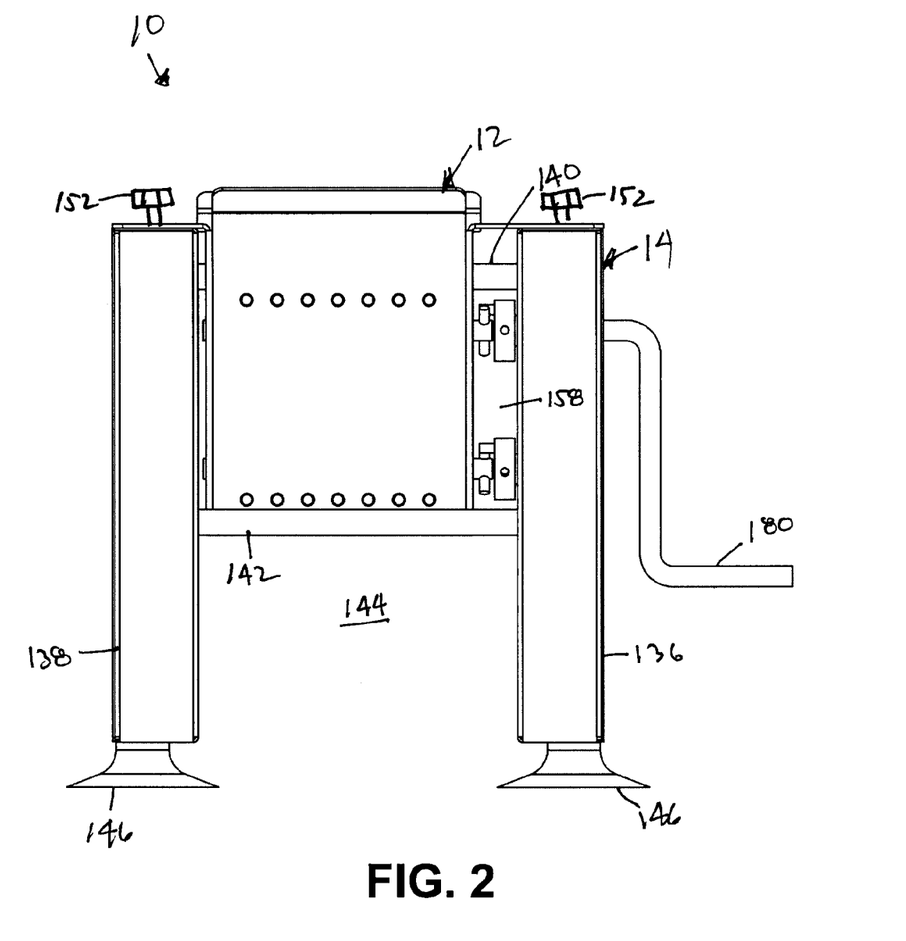
FIG. 2 is a top view of the apparatus of FIG. 1.

Shredded product drops out of the bottom opening 36 into an optional removable bin 16, shown in FIGS. 1 and 4.

The locations of the peg rows 102, 104, 106, 108, that is, the vertical distances of the peg rows 102, 104, 106, 108 from the rotor assemblies 78, 80, were determined by experimentation to achieve the maximum and most efficient shredding of the product. This shredder 10 of the present invention works very well because the product passes through uneven peg locations and through two different rotor assemblies 78, 80. No shredders of the prior art do this.

In prior art shredders, the rows of pegs on the front and back are vertically aligned with the rotor assembly. This location does not work very well because it only provides force against the food product in one orientation. When the pegs and fingers pass during operation, they are parallel to each other. In the present invention, when the pegs 100 and fingers 120 pass each other, they are not parallel, but are offset by an angle of a few degrees. This provides a tearing force on the product from two different non-aligned angles, rather than the same angle of the prior art.

Thus it has been shown and described a meat shredder. Since certain changes may be made in the present disclosure without departing from the scope of the present invention, it is intended that all matter described in the foregoing specification and shown in the accompanying drawings be interpreted as illustrative and not in a limiting sense.

What is claimed is:

1. A meat shredder comprising:
    (a) a frame having a right stand and a left stand attached together and spaced apart by a plurality of crossbars to form a hopper space between the right stand and the left stand;
    (b) a hopper suspended within the hopper space and having a front wall, a back wall, a right side wall, a left side wall, a top opening, and a bottom opening defining a shredding region, the shredding region having a depth that is the distance between the front wall and back wall;
    (c) an upper rotor assembly mounted to rotate horizontally within the shredding region between the right side wall and the left side wall, the upper rotor assembly including an upper arbor with an upper rotor assembly axis and a plurality of upper fingers extending radially from the upper arbor and arranged in a plurality of paraxial upper rows spaced around the upper arbor;
    (d) a lower rotor assembly mounted to rotate horizontally within the shredding region between the right side wall and the left side wall, the lower rotor assembly including a lower arbor with a lower rotor assembly axis and a plurality of lower fingers extending radially from the lower arbor and arranged in a plurality of paraxial lower rows spaced around the lower arbor, the lower rotor assembly vertically aligned with and spaced from the upper rotor assembly;
    (e) an upper back row of pegs extending horizontally from the back wall into the shredding region and vertically spaced below the upper rotor assembly axis by at least 0.25 inch, the pegs being space apart such that the fingers of the upper rotor assembly travel between the pegs as the upper rotor assembly rotates;
    (f) a lower front row of pegs extending horizontally from the front wall into the shredding region and vertically spaced below the lower rotor assembly axis by at least 0.25 inch, the pegs being space apart such that the fingers of the lower rotor assembly travel between the pegs as the lower rotor assembly rotates;
    (g) a drive mechanism for rotating the upper rotor assembly and the lower rotor assembly in opposite directions;
    (h) whereby the upper rotor assembly rotates to push product dropped into the top opening against the upper back row of pegs, thereby shredding the product, the product dropping to the lower rotor assembly that pushes the product against the lower front row of pegs to further shred the product, the product dropping out of the bottom opening.

2. The meat shredder of claim 1 further comprising:
    (a) an upper front row of pegs extending horizontally from the front wall into the shredding region and vertically spaced above the upper rotor assembly axis by at least 0.25 inch, the pegs being space apart such that the fingers of the upper rotor assembly travel between the pegs as the upper rotor assembly rotates; and
    (b) a lower back row of pegs extending horizontally from the back wall into the shredding region and vertically spaced above the lower rotor assembly axis by at least 0.25 inch, the pegs being space apart such that the fingers of the lower rotor assembly travel between the pegs as the lower rotor assembly rotates.

3. The meat shredder of claim 2 wherein the hopper, pegs, and fingers are composed of stainless steel.

4. The meat shredder of claim 1 wherein the upper rows of fingers are spaced evenly around the upper arbor and the lower rows of fingers are spaced evenly around the lower arbor.

5. The meat shredded of claim 1 wherein a largest diameter of the upper rotor assembly and a largest diameter of the lower rotor assembly is slightly smaller than a depth of the shredding region.

6. The meat shredder of claim 1 wherein the hopper is formed by a front shell and a back shell pivotally attached at a pivot point adjacent to the bottom opening, wherein the hopper has an open position wherein the shredding region is accessible and a closed position retained by a shell closure.

7. The meat shredder of claim 6 wherein the upper rotor assembly and the lower rotor assembly are removable when the hopper is in the open position.

8. The meat shredder of claim 6 wherein the front shell and back shell are separable when the hopper is in the open position.

9. The meat shredder of claim 1 wherein the hopper, pegs, and fingers are composed of stainless steel.

* * * * *